(No Model.)

G. H. ALLEN.
SPINDLE BEARING.

No. 262,268. Patented Aug. 8, 1882.

Witnesses.
John F. E. Prinkert
Bernice J. Noyes

Inventor.
George H. Allen
by Crosby & Gregory Attys.

UNITED STATES PATENT OFFICE.

GEORGE H. ALLEN, OF AYER, MASSACHUSETTS.

SPINDLE-BEARING.

SPECIFICATION forming part of Letters Patent No. 262,268, dated August 8, 1882.

Application filed April 19, 1882. (No model.)

*To all whom it may concern:*

Be it known that I, GEORGE H. ALLEN, of Ayer, county of Middlesex, State of Massachusetts, have invented an Improvement in Spindle-Bearings, of which the following description, in connection with the accompanying drawings, is a specification.

My invention has for its object such construction of the bolster-tube and step which constitute lateral and end bearings for the spindle that the latter is permitted to move and center itself to its load, thus avoiding gyrating motion. Others have sought to gain this object by various mechanical contrivances. In this my invention I employ a supporting-tube and place within it loosely a bolster-tube, within which in turn I place a step for the end of the spindle. To prevent this bolster-tube, placed loosely in the supporting-tube, from rotating with the spindle, but yet permit it to move laterally within the supporting-tube sufficiently to center itself with freedom to accommodate any inequality of load, I have provided the bolster-tube and step with a hole or opening, through which I have extended loosely a pin or stud of less diameter, so that the bolster-tube and its connected step are free to move on the said pin sufficiently to enable the spindle to move and find its true center of rotation.

Figure 1:
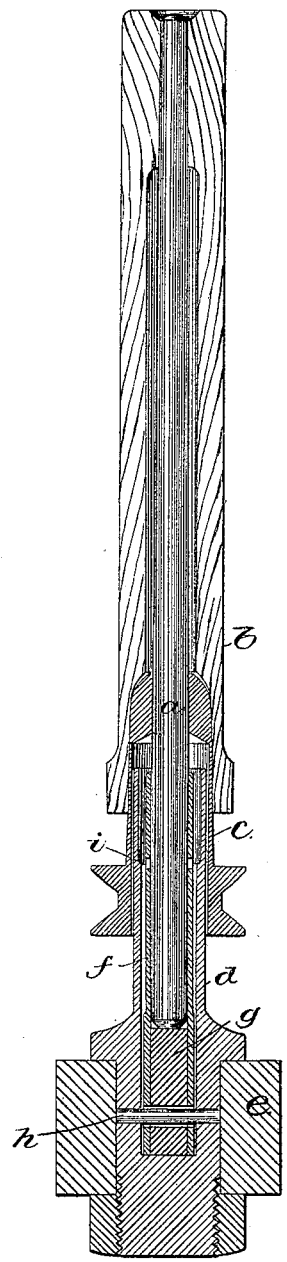
Figure 2:

Figure 1 represents, partially in vertical section, a sufficient portion of a sleeve-whirl spindle, a supporting-tube, bolster-tube, step, step-rail, and bobbin to illustrate my invention; and Fig. 2 represents the bolster-tube removed.

On the drawings, *a* represents a spindle, *b* a bobbin, *c* a sleeve-whirl connected with the spindle, *d* a supporting-tube, and *e* a step-rail, all of usual construction.

The longitudinal central opening of the usual supporting-tube receives oil and constitutes the oil well or supply for lubricating the spindle-bearings. In this opening or oil-well I place the bolster-tube *f*, making the latter, however, of somewhat less diameter externally than the internal diameter of the bolster-tube, so that the said bolster-tube, when central in the opening of the supporting-tube, will not touch the side walls of the latter, thus leaving a space all about the bolster-tube in which it may move, as the spindle, by means of unequal loading, seeks its true center of rotation.

Within the lower end of the bolster-tube I have placed the step or end bearing, *g*. The step and bolster-tube are bored transversely or at right angles to the direction of their length, and through the transverse coinciding holes or openings thus formed in the bolster-tube and step is inserted a pin or stud, *h*, the ends of which are held in the walls of the supporting-tube, and, as shown in the drawings, this pin or stud is of considerably less diameter than the holes or openings made in the bolster-tube and step, thus affording a space about the said pin sufficient to permit the bolster-tube and step to move freely for a sufficient distance in nearly every direction to enable the spindle fitted within the bolster-tube and resting on the step to practically find its true center of rotation. The pin or stud prevents the bolster-tube and step from rotating with the spindle.

In this way, and by the means shown and described, I am enabled to produce at small cost a very simple and durable spindle and supporting devices for it—devices fully efficient for the purposes intended.

The bolster-tube will have suitable oil-passages, as at *i*.

I have shown my invention embodied in connection with a sleeve-whirl spindle; but it is obvious my invention is applicable to the usual form of spindles having the whirl directly attached thereto above the bolster.

The bolster-tube, near its upper end, may be slightly smaller in diameter externally than at its lower end, in order that the spindle may have opportunity to move the lower end of the bolster-tube when deflected, before the upper end of the said tube is arrested by the supporting-tube.

I claim—

1. The spindle, the bolster-tube, and step provided with transverse holes or openings for the reception of a pin or stud, and the supporting-tube provided centrally with a passage or oil-well greater in diameter than the bolster-tube, and in which passage the said bolster-tube is loosely placed, combined with the pin or stud *h*, to prevent the rotation of the bolster-tube with the spindle, yet permit the said bolster-tube and step to move sufficiently in the supporting-tube to enable the spindle to find its proper center of rotation, as and for the purpose described.

2. The supporting-tube, the step, and the bolster-tube, held loosely in the supporting-tube, combined with the pin $h$, extended through holes of the bolster tube and step to hold the said tube and step loosely, as and for the purpose set forth.

3. The spindle, its step, and the bolster-tube, having its upper portion reduced in diameter externally, combined with the supporting-tube, whereby the upper end of the bolster-tube is adapted to be moved farther than its lower end before being arrested by the supporting-tube, substantially as and for the purpose described.

In testimony whereof I have signed my name to this specification in the presence of two subscribing witnesses.

GEORGE H. ALLEN.

Witnesses:
GEO. W. GREGORY,
W. H. SIGSTON.